United States Patent [19]

Hinton et al.

[11] Patent Number: 4,459,010

[45] Date of Patent: Jul. 10, 1984

[54] LINEAR LENS ARRAY SCANNING SYSTEM FOR A MULTI-MAGNIFICATION COPIER

[75] Inventors: John H. Hinton, Ontario; Daniel W. Costanza, Webster; James D. Rees, Pittsford, all of N.Y.

[73] Assignee: Xerox Corporation, Stamford, Conn.

[21] Appl. No.: 373,461

[22] Filed: Apr. 30, 1982

[51] Int. Cl.³ ............................................. G03G 15/28
[52] U.S. Cl. .......................................... 355/8; 355/55; 355/1
[58] Field of Search ........................................ 355/8, 1

[56] References Cited

U.S. PATENT DOCUMENTS

| 3,544,190 | 12/1970 | Moorhusen et al. | 350/6 |
|---|---|---|---|
| 3,754,822 | 8/1973 | Melrose | 355/8 |
| 3,947,106 | 3/1976 | Hamaguchi et al. | 355/1 |
| 3,977,777 | 8/1976 | Tanaka et al. | 355/1 |
| 4,129,373 | 12/1978 | Ogura et al. | 355/1 |
| 4,415,258 | 11/1983 | Rees et al. | 355/8 |

FOREIGN PATENT DOCUMENTS

| 0040548 | 11/1981 | European Pat. Off. |
| 53-97436 | 8/1978 | Japan . |
| 55-1206 | 1/1980 | Japan . |
| 55-52074 | 4/1980 | Japan . |

OTHER PUBLICATIONS

U.S. Pat. Ser. No. 190,160, 06001982, Durbin, 350, 143.

Primary Examiner—J. V. Truhe
Assistant Examiner—David Warren

[57] ABSTRACT

A document reproduction system is disclosed which employs an imaging array assembly positioned to transmit reflected images from a document in an object plane onto an imaging plane. The imaging assembly includes a 1X lens array and at least one reduction/enlargement lens array. The overall dimensions of the total imaging area of the reproduction system are reduced from conventional fixed lens or fixed document system by providing means for moving the document, imaging assembly and imaging plane in certain prescribed relationships. These means include a pulley/cable/clutch arrangement which enables changes in velocity relationships which are required for a unity magnification mode of operation as well as those for a reduction or enlargement modes of operation.

6 Claims, 4 Drawing Figures

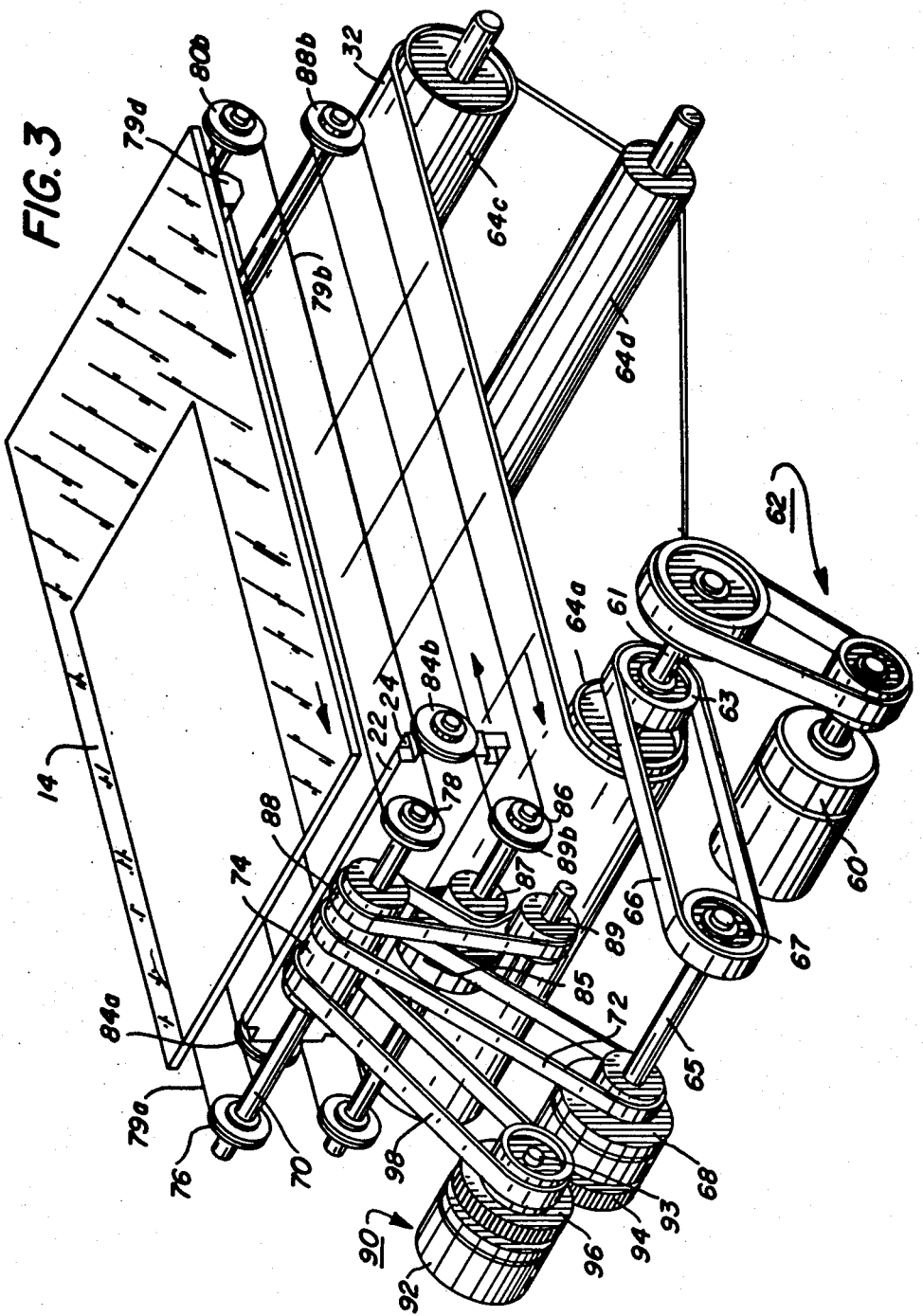

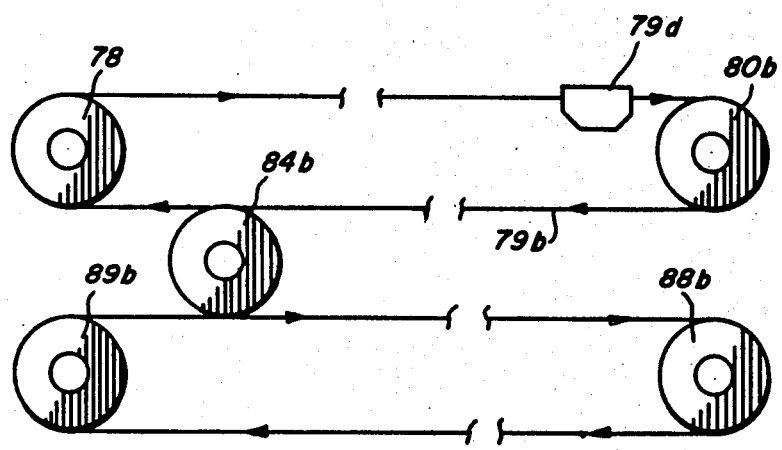

LINEAR LENS ARRAY SCANNING SYSTEM FOR A MULTI-MAGNIFICATION COPIER

BACKGROUND AND PRIOR ART STATEMENT

The present invention relates to an imaging system for a document reproduction device which utilizes a linear lens array in an optical system to transmit an image of a document to an object plane to an image plane through a magnification range. More particularly, the invention relates to an imaging system which utilizes a moving document, a scanning lens array and a moving photoreceptor in a unique set of velocity relationships.

Document reproduction systems utilizing linear lens arrays imaging systems are known to the art in two principal embodiments. U.S. Pat. No. 3,544,190 is representative of these systems which utilize a linear stacked array of lenslets known as "strip lenses". U.S. Pat. No. 3,977,777 is representative of those scanning systems utilizing a scanning lens array comprising bundled gradient index optical fibers. Both these latter imaging systems are desirable for use in document reproduction machines because they transmit an erect image at an imaging plane, have a short total conjugate and greatly reduce the mass and expense associated with the conventional lens, multi-mirror scan systems. Gradient index lens arrays have especially found wide acceptance as replacements for conventional image transmitting components in copiers as disclosed, for example, in U.S. Pat. Nos. 3,947,106 and 3,977,777. Each of these prior art copiers uses a single gradient index lens array to transmit images at a magnification of 1:1. And each of these imaging systems utilizes a fixed lens system, scanning being accomplished by moving the document past the lens in conjunction with a similar motion of a photoconductive imaging plane.

These systems, which can be characterized as "moving platen" systems, impose constraints on equipment size since the platen must travel the width of a document during the scan cycle.

Other scanning systems are known which accomplish the scanning function by moving a linear lens array beneath a fixed document. Illustrative of such systems are the scanning systems disclosed in U.S. Pat. No. 4,129,373 (FIG. 1) and Japanese Publication No. 55-1206.

A third possibility exists wherein the document, photoconductive imaging plane and linear lens array all move at speeds bearing a certain relationship to each other. This type of system, as disclosed in Japanese Publications Nos. 53-97436 and 55-52074 and U.S. Pat. No. 3,754,822 (Melrose) has the desirable characteristics of compactness coupled with increases in process speed.

All of the above-disclosed systems are related to imaging systems which transmit images at unity (1X) magnification. To enable a multi-magnification copier utilizing a linear lens array, a variety of problems are present which have heretofore not been completely resolved. One example of utilizing a linear lens array in a multi-magnification mode system is disclosed in copending U.S. application Ser. No. 151,994, published as European Publication No. 0040548 on Nov. 25, 1981, assigned to the same assignee as the present invention. In this application various reproduction systems are disclosed which utilize a gradient index lens array as the imaging device. One embodiment discloses a lens assembly consisting of a 1X array coupled with a reduction/enlargement lens array, the latter constructed according to the principles disclosed in said application. This system utilizes a moving platen and fixed lens array, the platen to photoreceptor speed changing during magnification changes to maintain proper image exposure at the photoreceptor.

It is desirable to improve throughput at the same process speed and reduce the size of this type of multi-magnification system, as well as other systems employing linear lenses in a multi-magnification copying device. The present invention is therefore directed to an imaging system for projecting an erect image of a document lying in an object plane onto a photoreceptor lying in an image plane and at a plurality of magnifications, said system including:

an imaging assembly positioned between said object plane and photoreceptor, a drive arrangement for moving said document, photoreceptor and imaging assembly in a unity magnification scanning mode, said arrangement comprising:

first drive means for driving said photoreceptor in a first direction at a first velocity v, second drive means for driving said document in said first direction at a velocity v' where v'=v, and third drive means driving said imaging assembly at a third velocity v'' in a second direction opposite to the said first direction, said drive arrangement further adapted to move said document, photoreceptor and imaging assembly in a non-unity magnification mode such that said first, second and third velocities are related by the expression:

$$v' = \frac{v}{m} + v'' \left( \frac{1-m}{m} \right)$$

An additional feature of the above system is the added advantage of enabling the scanning system in a precession scanning mode. As described in copending Application Ser. No. 190,160, assigned to the same assignee as the present invention, the scanning of a document is accomplished at a faster rate than the process speed so as to cause the image at the image plane to be precessed, or moved, along the image plane in a direction opposite to the movement of the image plane. A major advantage of any precession system is that it can reduce throughput time by using the process distance gained during the precession activity to accomplish a specific time consuming activity such as placing a new document on the platen and/or returning the scan system to a start-of-scan position.

DRAWINGS

FIG. 3 shows a portion of a variable control drive system for driving the platen, imaging assembly and photoreceptor of FIG. 2 at the desired velocities.

FIG. 4 shows a particular cable entrainment in the FIG. 3 control system.

DESCRIPTION

In aforementioned U.S. application Ser. No. 151,994, whose contents are hereby incorporated by reference, a gradient index lens array assembly is disclosed which transmits an image of a document at an object plane onto an image plane at a unity magnification as well as magnifications other than unity. Briefly, this result is obtained by assembly and design of the gradient index optical fibers which comprised the array according to the principles set forth in that application. Each fiber, or, more precisely each fiber axis, is oriented in a prescribed fashion with relation to adjoining fibers. Each fiber length is adjusted to maintain the required conjugate distance. When the fibers are assembled at the length appropriate for the linear distance to be imaged, the resulting lens array assumes a characteristic fanfold shape.

Figure 1:
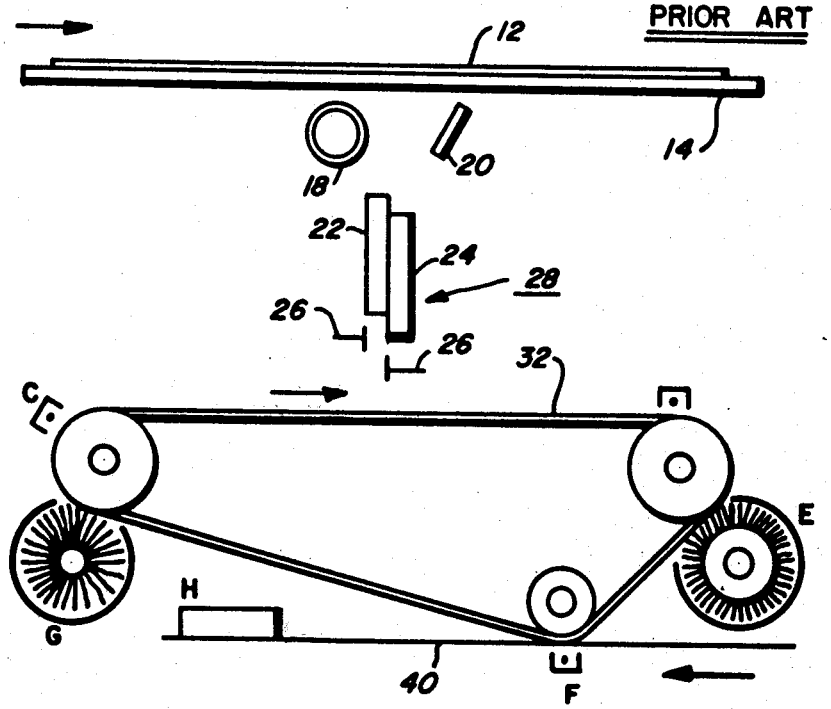
FIG. 1 is a schematic showing a prior art multi-magnification document reproduction system wherein a gradient index lens array and associated lamp is utilized as an imaging assembly and wherein the lens array is stationary and the platen and photoreceptor move in the indicated direction.

FIG. 1 illustrates a prior art embodiment wherein a conventional 1X lens array is used in conjunction with a reduction/enlargement lens array designed for a particular magnification which, in the system disclosed, is a 0.707X reduction.

As shown in FIG. 1, a document 12 is placed on platen 14 which is adapted to move past a narrow longitudinally extending illumination strip 16. Strip 16 is brightly illuminated by apertured lamp 18 acting in combination with a reflector 20. A gradient index lens array assembly includes gradient index lens array 22, which transmits an image at unity magnification, and a reduction lens array 24 connected to array 22. Shutter 26 is adapted to move in the direction indicated or, alternately may remain stationary and means (not shown) may move the appropriate lens array into transmitting position. Lamp 18, reflector 20, and lens arrays 22, 24 together form an imaging assembly 28.

In operation, platen 14 is moved through the illuminated area. Light impinging on a narrow longitudinal strip of the document is reflected towards the lens array assembly. Since the shutter 26 is covering lens array 24, lens array 22 transmits the reflected image, at unity magnification onto photoreceptor belt 32 rotating at the same speed as the platen. Belt 32, previously receiving an electrostatic charge at station C, is then exposed in image-wise fashion. The latent image is developed at development station E by application of toner material of appropriate polarity. The developed image is brought into contact with support sheet 40 within a transfer station F and the toner image is electrostatically attracted from belt surface 32 to the contacting side of the support sheet. Any residual toner particles remaining on belt 32 after the completion of the transfer operation are removed within a cleaning station G, placing the surface in a condition to repeat the exposure and development process. After the transfer operation, the image bearing support sheet is forwarded to a fusing station 4 via a suitable conveyor. These various xerographic process stages are well known in the art.

The configuration shown in FIG. 1 is limited in that the moving platen adds to the size of the imaging system in the direction of platen movement. The throughput is also limited since successive copies of the same document (or of a new document) are delayed for at least the return time of the platen to the start-of-scan position.

Figure 2:
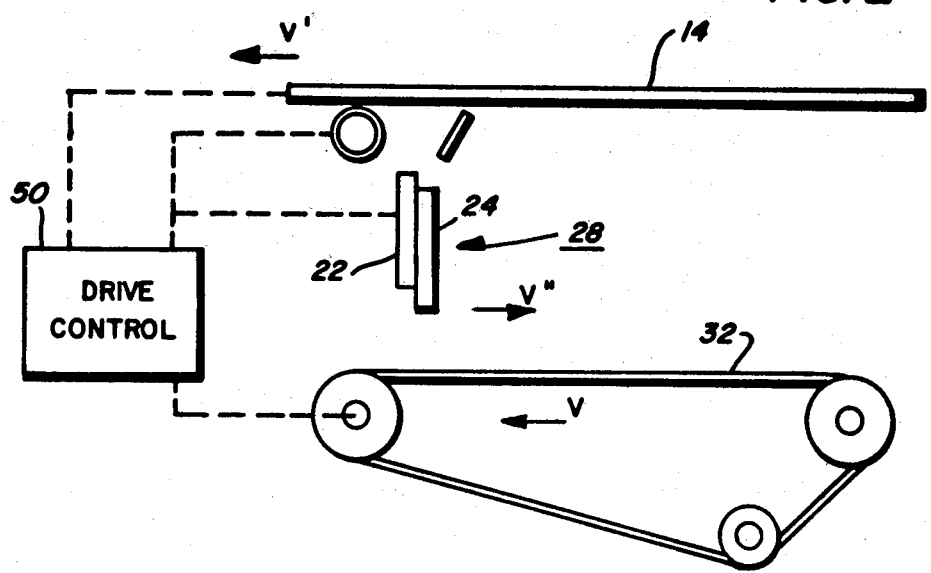
FIG. 2 shows the imaging system of FIG. 1 wherein platen, imaging assembly and photoreceptor are moved in the indicated direction at velocities dependent upon the magnification mode selected.

FIG. 2 shows the system of FIG. 1 modified by providing a horizontal motion to imaging assembly 28. A drive control system 50, shown in detail in FIG. 3, drives platen 14 (document 12), assembly 28 and belt 32 at various speeds and in the indicated direction depending on the magnification mode selected.

For purposes of the following discussion, the scanning rates of movement, or velocities, of the various moving components during a document scan operation are identified as follows:

photoreceptor 32 velocity = v
platen 14 (document 12) velocity = v'
imaging assembly 28 velocity = v''

The general principle applicable to any document imaging system is that, to obtain properly focused, blur-free imaging, the velocity of the image being transmitted to the photoreceptor must be synchronized to the velocity of the photoreceptor. For the system of FIG. 2, this principle requires consideration of the object, image and photoreceptor velocities with regard to the imaging assembly velocity.

To maintain the necessary image-to-photoreceptor velocity ratio, $$v' = \frac{v}{m} + \frac{v''(1-m)}{m} \qquad (1)$$

Equation (1) provides the general conditions for determining the necessary velocity relationships which will enable the FIG. 2 system. With a document of width w on the platen, the exposure velocity is $v + v''$, the image width at the photoreceptor is $mw$ and the exposure time is $$\frac{mw}{v + v''}.$$

Then the necessary platen, imaging assembly and photoreceptor displacements are defined by the following equations.

$$\text{Platen displacement} = \left[\frac{v}{m} + \frac{v''(1-m)}{m}\right]\left[\frac{mw}{v+v''}\right] = w - \frac{mv''w}{v+v''} \qquad (2)$$

$$\text{Imaging assembly displacement} = \frac{mv''w}{v+v''} \text{ and} \qquad (3)$$

$$\text{Photoreceptor displacement} = \frac{mvw}{v+v''} \qquad (4)$$

From the above equations, the sum of the platen displacement and the lens displacement equals the document width w for any value of imaging assembly velocity v'', photoreceptor velocity v or platen velocity v'. Also, the imaging assembly displacement plus the photoreceptor displacement equals the image width mw for any value of v, v' or v''.

Given the above relationships expressed in equation (1), it will be evident that the relative speeds of platen imaging assembly and photoreceptor will vary depending upon the particular magnification selected for the document reproduction. A unity magnification mode will require one set of velocity relationships to be established while a reduction or enlargement value will necessitate a change. According to the principle of the present invention, drive control system 50 is adapted to vary these velocity relationships upon selection of a particular magnification mode.

FIG. 3 shows a preferred embodiment of drive system 50 (shown in block form in FIG. 2). This drive system translates an initial motion imparted to the photoreceptor belt 32 into the required motions of platen 14, imaging assembly 28 by using a combination of pulleys, drive cables and clutches. Referring to FIG. 3, the system components are shown in a start-of-scan position, the imaging assembly scanning direction being from left to right, and platen and photoreceptor movement from right to left.

Photoreceptor belt 32 is continually driven in a counterclockwise direction at a velocity v by means of motor 60 driving shaft 61 via belt/pulley assembly 62. Belt 32 is entrained about drive pulley 64a which is driven by shaft 61. The belt is driven in the counterclockwise direction being maintained in a flat exposure condition by entraining along roller pulleys 64a, 64b, 64c. The motion of drive pulley 63 is transmitted to jackshaft 65 via timing belt 66 entrained about pulley 63 and pulley 67. For the 1X reproduction mode of operation, belt 66 motion is transmitted in the same direction as platen 14 by energizing clutch 68. This action transmits the motion of jackshaft 65 to platen drive shaft 70 via belt 72 driving pulley 74. Shaft 70 drives a pair of capstan pulleys 76, 78, in a counterclockwise (scan) direction. Drive cables 79a, 79b are entrained about pulleys 76, 78 and idler pulleys 80a (not visible), 80b. Platen 14 is carried on a carriage arrangement (not shown) to which the drive cables are fixedly connected at ground points 79c (not visible) 79d.

Lens arrays 22, 24 are fixedly connected to lens capstan pulleys 84a, 84b. Cables 79a, 79b are entrained about these capstans. The entire drive system formed by these cables is shown schematically in FIG. 4 which depicts the connection of cable 79b. Starting from the right side of platen carriage ground point 79d, cable 79b makes a 180° turn about idler pulley 80b, a 180° turn about lens capstan pulley 84b, a 180° turn about idler pulleys 88b, 89b attached to the ends of shaft 86, and another 180° turn again about capstan pulley 84b. The cable is wrapped about drive pulley 78 and terminates at the left side of ground point 79d.

With this drive arrangement, it is possible to impart two velocities to lens arrays 22, 24 depending upon whether clutch 85 is engaged or disengaged. In the 1X mode, where lens array 22 is to be placed into the optical path, clutch 85 is disengaged and grounds shaft 86 and pulley 87, i.e. pulley 87 rotates freely without transmitting torque to shaft 86. For this situation, the lower portion of cables 79a, 79b which drive the lens arrays via pulleys 88a,b, 89a,b have an effective velocity component of zero. The lens assembly is then being driven at a velocity which is the average of the platen velocity and the velocity component supplied by shaft 86 (0). The lens assembly has a velocity of $$v' + 0/2 \text{ or } \frac{-v'}{2}.$$

By Equation (1) belt 32 velocity v=v'. With the platen and belt moving leftward at a velocity v' and the lens array moving rightward at $$\frac{-v'}{2},$$

a conventional 1X, full-rate, half-rate scanning system is enabled.

For a reduction mode of operation, lens array 24 is placed in the optical path and appropriate signals are sent to motor 60 to increase the velocity of the platen. Clutch 85 is engaged thus bringing drive belt 88, driven by platen drive pulley 89, into driving contact with lens drive pulley 87. Pulley 87 drives shaft 86 imparting a velocity component to that shaft, and hence to the lower portion of cables 79a, 79b. This velocity component is determined by the ratio of pulleys 76, 78, 84, 87 and 88a, 88b. For the reduction case, the resultant lens array 24 velocity v" is the average of the upper portion (platen drive) of cables 78a, 79b and the lower (lens drive) portion. This feature of the invention permits a flexible system which enables a linear lens array to be driven at any given velocity by simply changing the pulley ratios of the platen and imaging assembly drive systems.

The systems thus far described can also be characterized as a precession type system. That is, the image being laid down on the photoreceptor surface during scan is being precessed or "walked" along the photoreceptor belt surface in a direction opposite to the belt motion. If the imaging assembly and platen are returned to the start-of-scan position at the scan velocity, the next scan cycle can begin without the usual inter-document gap associated with fixed lens systems. This feature permits some relaxation in the rescan time and also frees up time to place a new document on the platen with minimal loss of throughput.

Additional means are required to return the scan components to the beginning of scan position. These are supplied by means of rescan drive assembly 90. A limit switch (not shown) at the end of scan position disengages scan clutch 68 and engages rescan clutch 92. Shaft 93 is then driven at the photoreceptor velocity, causing rescan drive pulley 96 and rescan belt 98 to rotate in a clockwise direction. Belt 98 is entrained about platen drive pulley 74 and drives the capstan pulleys 76, 78 in a clockwise direction, reversing the motion of platen 14 and imaging assembly 28. These units will return to their assigned start-of-scan positions when another limit switch (not shown) disengages clutch 94 and reengages clutch 68.

EXAMPLE

Table 1 lists the characteristics for an exemplary imaging system utilizing the moving platen mode described with reference to FIGS. 2 and 3. A process (photoreceptor) speed of 7 inches/sec. is assumed. The values shown do not include the effects of the slit width (i.e. width w is slightly larger than the width of the document to be copied so as to take into account the typical 2-3 mm slit width) nor the small displacements required for acceleration and deceleration.

TABLE I

| | | | | |
|---|---|---|---|---|
| Magnification (m) | 1.0 | 1.0 | 0.647 | 1.546 |
| Object Width (w) (inches) | 8.5 | 17.0 | 17.0 | 11.0 |
| Photoreceptor (process) Speed (v) (in/sec) | 7.0 | 7.0 | 7.0 | 7.0 |
| Imaging Assembly Speed (v") (in/sec) | 7.0 | 7.0 | 7.44 | 3.35 |
| Platen Speed (v') (in/sec) | 7.0 | 7.0 | 14.88 | 3.35 |
| v'/v" | 1.0 | 1.0 | 0.5 | 1.0 |

TABLE I-continued

| | | | | |
|---|---|---|---|---|
| Exposure Speed (in/sec) | 14.0 | 14.0 | 14.44 | 10.35 |
| Exposure Time (sec) | 0.61 | 1.21 | 0.76 | 1.64 |
| Platen Displacement (in) | 4.25 | 8.50 | 11.33 | 5.50 |
| Lens Displacement (in) | 4.25 | 8.50 | 5.67 | 5.50 |
| Photoreceptor Displacement (in) | 4.25 | 8.50 | 5.33 | 11.50 |

Other variations of the embodiments may be made consistent with the principles of the invention. For example, the rescan velocity can be altered by changing the diameter of rescan pulley 96 relative to drive pulley 74. Thus, it is possible to rescan at a velocity greater than the scan velocity. By control of lamp illumination timing, the lens assembly can be used to transmit light onto spaces between document images.

And while the described embodiments have utilized gradient index lens arrays as the imaging members, the principles of the invention are applicable to other linear imaging transmitters such as lens strips or any imaging system which projects erect images onto a photosensitive plane.

Also, it may be pointed out that, while lens array 24 in the disclosed embodiments provided a reduction of the image, reversal of the lens array orientation consistent with the principles of the aforesaid Application Ser. No. 151,994 provide an enlarged image at the photoreceptor.

What is claimed is:

1. An imaging system for projecting an erect image of a document lying in an object plane onto a photoreceptor lying in an image plane parallel to said object plane and at a plurality of magnifications, said system including:

an imaging assembly positioned between said object plane and photoreceptor, an integral drive mechanism adapted to simultaneously move said document, photoreceptor and imaging assembly, at independent velocities, said mechanism comprising a first drive means for driving said photoreceptor in a first direction at a first velocity v, a second drive means for driving said document in said first direction at a velocity v', and a third drive means for driving said imaging assembly in a third velocity v" in a second direction opposite to the said first direction, said drive mechanism being further adapted to provide a first set of velocity relationships in a unity magnification scanning mode and at least a second set of velocity relationships in a non-unity magnification mode.

2. The imaging system of claim 1 wherein the system operates in a non-unity mode and wherein said first, second and third velocities are related by the expression:

$$v' = \frac{v}{m} + v'' \left( \frac{1-m}{m} \right),$$

where m is the magnification value.

3. The imaging system of claim 1 wherein the system operates in a unity magnification mode and wherein $v' = v''$.

4. The imaging system of claim 1 wherein said magnification is 1 and where $$v'' = \frac{v'}{2}.$$

5. The imaging system of claim 1 wherein said document and imaging assembly are moved from a start of scan to an end of scan position, said system further including reverse drive means to move said document and assembly back to the start of scan position.

6. The imaging system of claim 1 wherein said imaging assembly includes a first gradient index lens array for transmitting an image of said document onto said photoreceptor at unity magnification and a second gradient index lens array for transmitting an image of said document onto said photoreceptor at a magnification other than unity.

* * * * *